United States Patent [19]

Youmans

[11] Patent Number: 4,733,475
[45] Date of Patent: Mar. 29, 1988

[54] EXTENSION LEVEL APPARATUS

[76] Inventor: John W. Youmans, 546 Meadow Rd., Princeton, N.J. 08540

[21] Appl. No.: 51,760

[22] Filed: May 20, 1987

[51] Int. Cl.⁴ .......................... G01C 9/00; G01C 9/24
[52] U.S. Cl. ........................................ 33/372; 33/194; 33/374
[58] Field of Search ................. 33/194, 370, 371, 372, 33/374

[56] References Cited

U.S. PATENT DOCUMENTS

| | | | |
|---|---|---|---|
| 2,551,524 | 5/1951 | Bullivant | 33/374 |
| 2,973,584 | 3/1961 | Snapp | 33/194 |
| 3,102,345 | 9/1963 | Holland | 33/194 |
| 3,328,887 | 7/1967 | Wright | 33/372 |
| 4,435,908 | 3/1984 | Semler, Jr. | 33/374 |

Primary Examiner—Richard R. Stearns
Attorney, Agent, or Firm—Sachs & Sachs

[57] ABSTRACT

An extension level apparatus suitable for use with a carpenter's level includes in combination a pair of elongated frame members adapted to receive therein the carpenter's level and also includes a spring loaded extension member which permits the extension level to be retained in a wall opening into which a door is to be inserted. The extension level permits the user thereof to determine rapidly the exact vertical position of one vertical edge of the door jamb, allowing for shimming where necessary, and permits a measurement to be taken from a starting point to an end point where the second edge of the door opening is to occur. Hereagain the vertical alignment may be rapidly obtained with the use of shimming when necessary, thereby permitting the door jambs to be inserted rapidly and with accuracy.

9 Claims, 3 Drawing Figures

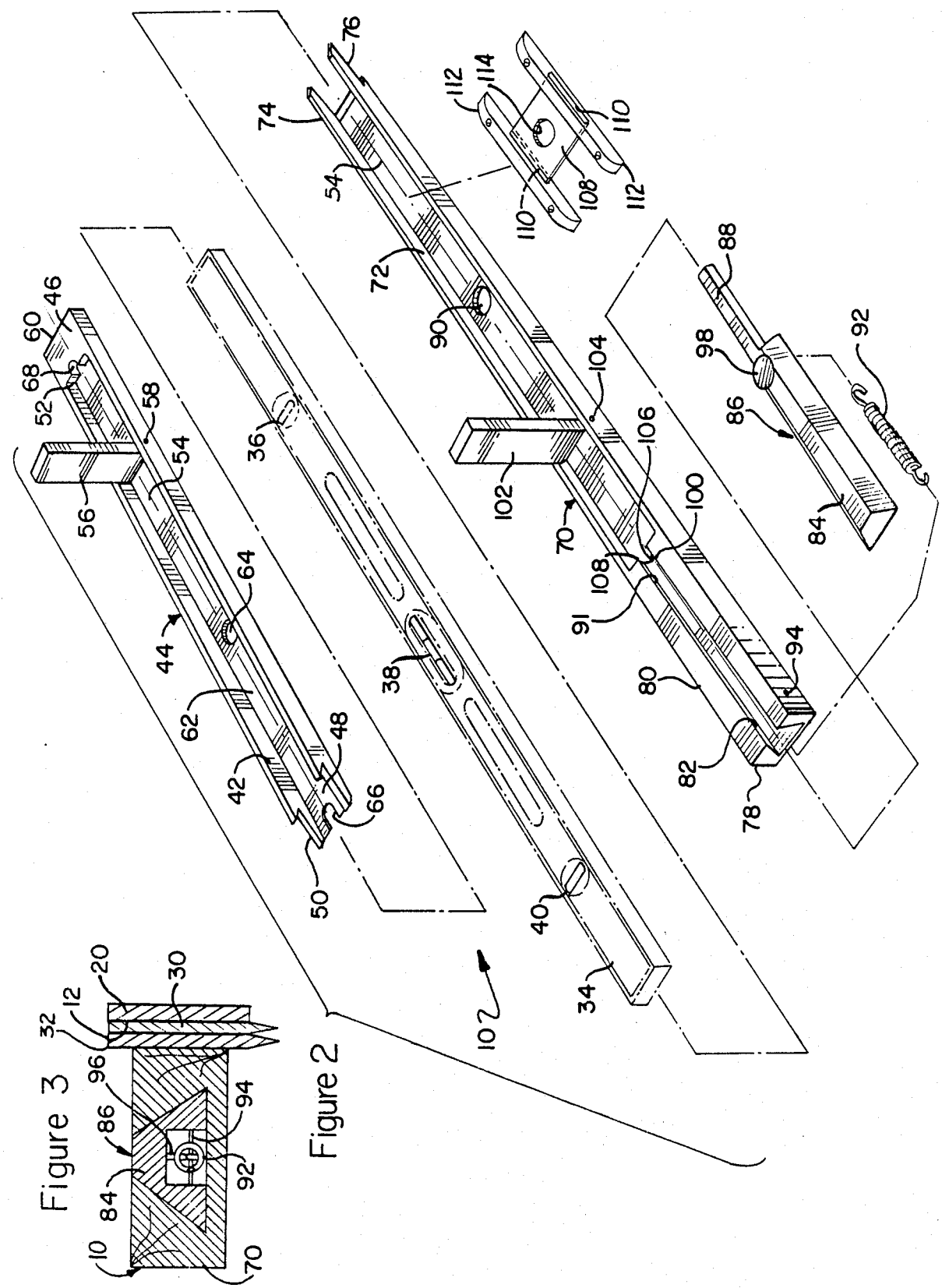

EXTENSION LEVEL APPARATUS

BACKGROUND OF THE INVENTION

1. Field of the Invention

The present invention relates to an instrument for use in the building trades and more particularly to an extension level apparatus for vertically aligning two points on spaced apart horizontal surfaces.

2. Discussion of the Relevant Art

The art abounds with numerous devices used by carpenters in order to expedite their work and make it easier for them to build structures utilizing wood members. In particular numerous devices have been suggested to aid a carpenter in installing door openings and mounting doors in a vertical wall. Many devices including a conventional carpenter's level assist the carpenter in determining the vertical position of a particular beam and/or to determine the horizontal portions of other beams. The accuracy of the conventional carpenter's level may be increased, as is well known, by extending the length of the level utilized together with known site glasses.

In particular, U.S. Pat. No. 2,551,524 issued to Bullivant on May 1, 1951 discloses an apparatus in which a carpenter's level may be extended over various lengths in order to increase its accuracy without increasing its physical size when collapsed for storage purposes.

U.S. Pat. No. 3,277,579 issued to Murphy on Oct. 11, 1966 attempts to solve the vertical alignment problem by providing an extension mechanism suitable for determining the location of two points on spaced horizontal surfaces with some degree of accuracy specifically for the purpose of installing partitions, or the like, and which may also be readily adapted for use in fixing the vertical edge door jambs so that they would be in proper alignment and spaced as required.

However, the aforementioned devices and other known mechanisms have the shortcoming of requiring the carpenter using the device to maintain one hand on the apparatus while attempting to shim or adjust the vertical member being installed in order to obtain true vertical accuracy. The device, as disclosed in the patent to Murphy U.S. Pat. No. 3,277,579, provides for the marking of the ceiling and floor utilizing the edge of the device, however, it is impossible to have flush alongside thereto a vertical beam, since there are outwardly extending protrusions which make it unsuitable for applications which require contact with the device and the beam being installed.

Therefore, it is an object of the present invention to provide a vertical extension level which is capable of providing lines or reference marks accurately positioned and in vertical alignment on spaced apart horizontal surfaces, such as a ceiling and floor.

It is another object of the present invention to provide an extension level suitable for determining the vertical position of a beam while being in intimate contact therewith.

It is yet another object of the present invention to provide an extension level apparatus capable of being self-retained within a door opening of a plurality of door heights.

It is still yet another object of the present invention to provide a reliable, accurate level apparatus suitable for use in determining the vertical as well as horizontal jamp members of a door being installed, permitting a carpenter to have both hands free for adjusting and/or shimming the vertical jamb members.

It is still yet another object of the present invention to provide an accurate, reliable apparatus suitable for use with a standard carpenter's level which permits a carpenter to rapidly install a door in a vertical wall.

SUMMARY OF THE INVENTION

An extension level apparatus, according to the principles of the present invention, suitable for use with a standard carpenter's level comprises, in combination, first and second frame members with the first frame member having a centrally disposed channel extending from one end and terminating at the other end in the solid portion. The channel is adapted to receive a portion of a carpenter's level therein. The distal edge of the solid portion is at right angles to the longitudinal axis of the first frame member. One end is provided with a V-shaped notch. Also, a second frame member included therewith has a centrally disposed channel extended from one end and terminating at the other end in a solid portion. The solid portion is provided with the centrally disposed undercut (trapezoidal) channel extending to the distal edge of the second frame member. The channel is adapted to receive the remaining portion of the carpenter's level. One end of the second frame member is provided with a V-shaped notch adapted to cooperate with the V-shaped notch provided in the first frame member. A length adjustment device has one portion adapted to slideably engage the second frame member undercut channel and moves freely therein. The one portion has a distal edge perpendicular to the longitudinal axis of the second frame member. A second portion of the length adjustment device extends towards the carpenter's level when the length adjustment device is disposed within the second frame member. The length adjustment device is provided with a locking device which locks the length adjustment device in a preselected position. The length adjustment device also includes an elongated spring member which has one affixed to the length adjustment device and the other end affixed to the second frame member for urging the length adjustment device towards the length extending position.

The foregoing and other objects and advantages will appear from the description to follow. In the description reference is made to the accompanying drawing which forms a part hereof and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 2 is an exploded view of the extension level showing how the members thereof are assembled; and FIG. 3 is a cross-sectional view taken along the line 3—3 of FIG. 1, and FIG. 4 is a pictorial representation of a removable retainer plate.

DESCRIPTION OF THE PREFERRED EMBODIMENT

Figure 1:
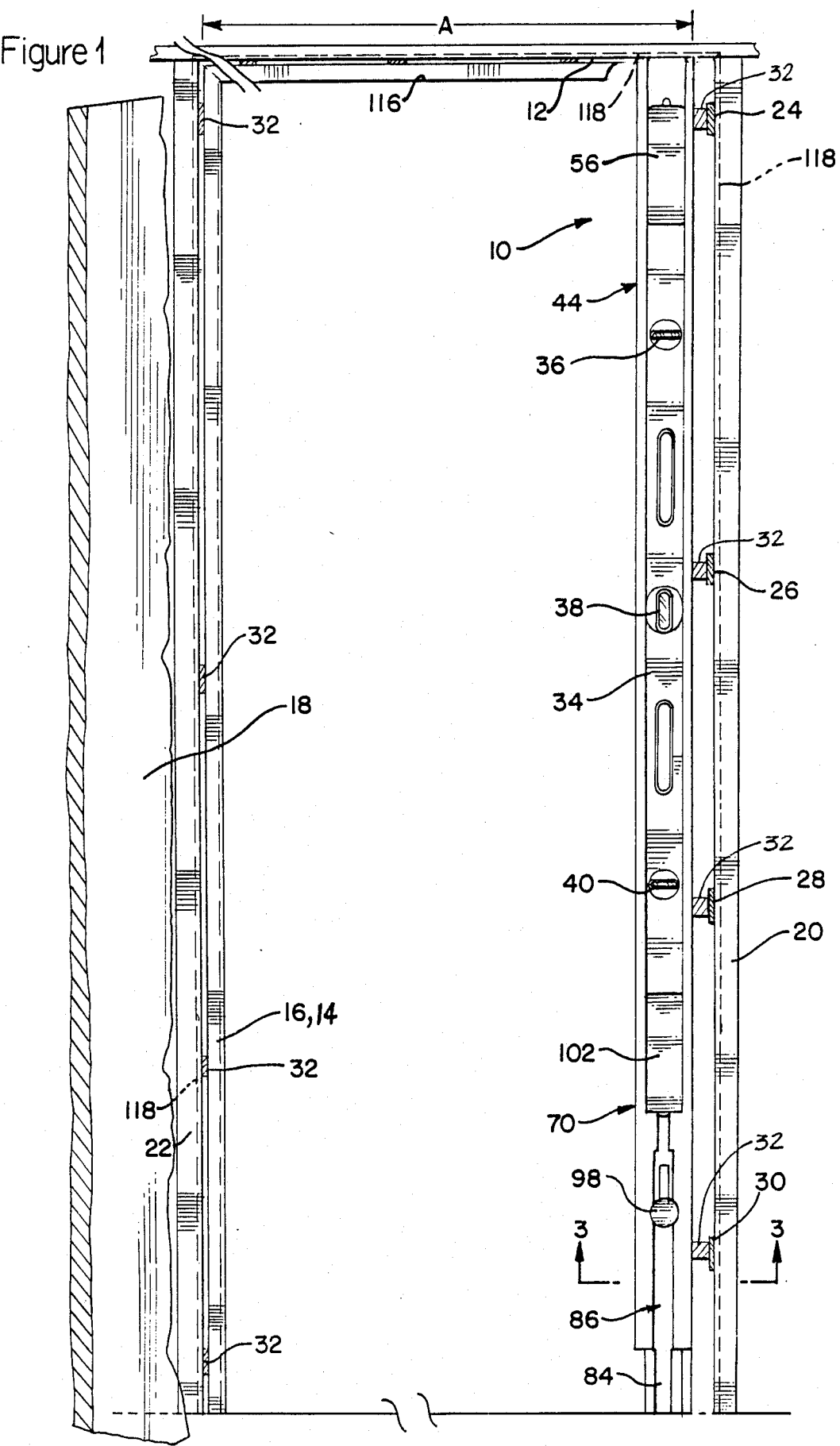
FIG. 1 is a pictorial representation, according to the principles of the present invention of the extension level apparatus in use in installing a door.

Referring now to the figures, and in particular, to FIG. 1 there is shown an extension level apparatus 10, according to the principles of the present invention, disposed within a rough opening 12 into which one may place a vertical jamb element 14 disposed at each vertical edge of the rough opening 12. Alternatively, a pre-hung door 18 with its pre-cut jambs 14 may be installed within the rough opening 12. One end of the pre-hung door frame jamb element 16 is normaly provided with hinges, not shown, designed to cooperate with mating hinges, not shown, provided on a door 18 adapted to swing freely and close within the pre-hung door frame 16. Door jamb elements 14 and 16, for proper operation of the door 18, must be installed in perfect vertical alignment. Therefore, although vertical beams 20 and 22 are generally spaced apart and may be in approximate alignment and are horizontally spaced in order to receive a door frame therebetween, it remains necessary to insure that door jambs 14 or 16 (for the pre-hung door) are in perfect vertical alignment and accurately spaced in order to properly be received into the rough door opening 12. Thus, knowing the dimension A required for the rough door frame opening 12, vertical jamb elements 14 and 16 must be shimmed into proper alignment with the aid of tapered shims 24, 26 28, 30 and 32. What is meant by perfect vertical alignment will be explained hereafter.

The explanation and description of the use of the extension apparatus 10 is described in relationship with a "pre-hung" door 18 and its associated door frame jambs 16 (one of each end of rough opening 13) which includes a pair of jamb elements 14 or 16. It is to be clearly understood that the extension level apparatus 10 may be utilized with or without the use of a pre-hung door and frame (pre-cut jambs 16). The extension level apparatus 10 may be independently positioned, since the extension level apparatus may be placed in intimate contact with the shims 24, 26, 28, 30, and 32 in order to insure perfect alignment of the jamb elements. The tapered shims are tacked into place, first on one side and then the extension level apparatus is moved to the other side of the rough door opening 12. The jambs 14 and 16 are placed into position and affixed therein with the aid of nails in a well known conventional manner.

A standard carpenter's level 34 which is used by a carpenter to determine both horizontal and vertical positions with accuracy typically contains three sight glasses 36, 38 and 40 which are filled with a liquid and contain an air bubble therein. The sight glasses include centrally disposed parallel markings generally disposed on the glass surface, as is well known in the art. When the bubble is disposed within the centrally disposed markings of the glass the carpenter is able to determine that the beam upon which the level is resting is either vertical or horizontal depending upon which of the bubbles are centered.

Referring now to FIG. 2 which is an exploded view of the extension level apparatus 10, it will be seen that the carpenter's level 34 is adapted to be frictionally received into a centrally disposed channel 42 which extends from one end of a first frame member 44 to a solid portion 46 at the other end of member 44. The distal edge 48 is provided with a V-shaped notch 50. The solid end 46 of frame member 44 is provided with an internal vertical surface 52 which is perpendicular to the longitudinal axis 54 of the first frame member 44.

Also disposed within the channel 42 is a extension block 56, whose purpose will be explained hereinafter, which is perferably seven (7) inches long. The extension block 56 is pivoted with a through hole that accepts a pin 58 forming a rotation axis preferably one inch from its edge. Thus, in one position, lying horizontal the extension block 56 will be pivoted toward end 46 and thus, the rear edge of block 56 being perpendicular to axis 46, will provide a resting place for the end of the carpenter's level 34. With extension block 56 pivoted away from edge 46 and towards edge 48 the carpenter's level 34 is moved an additional seven (7) inches away from the distal edge 60 provided on the solid end 46.

Additionally included in the bottom portion 62 of channel 42 is a through aperture 64 to permit viewing of the sight glass 36 or 38 when the level 34 is disposed within channel 42 either in its normal or extended positions. A second through aperture 66 is provided at the edge 48 of channel 42 so that the sight glass may be viewed therethrough if it should become necessary depending upon the position of the extension block 56. Thus, the apertures enable the user of the extension level apparatus 10 to view the sight glass from either side (top or bottom) of the apparatus. In addition, a finger notch 68 may also be included in the solid end portion 46 of the frame member 44 to enable the user thereof to more readily change the position of extension block 56.

A second frame member 70 is provided with a centrally disposed channel 72 extending from one end 74, which is provided with a V-shaped notch 76 adapted to cooperate with V-shaped notch 50 and terminates at its other end 78 in a solid portion 80 having a preferably trapezoidally-shaped channel (undercut channel) 82 which is adapted to slideably receive a mating trapezoidally-shaped, at one end 84, a length adjustment member 86 and is provided at its other end with a rectangularly-shaped portion 88 that is adapted to slideably be received ina rectangularly-shaped groove 90 provided in the solid portion 80 of the second frame member 70. The channel 72 of second frame member 70 is also provided with a through aperture 90 utilized for the viewing of the sight glasses of the carpenter's level in the same manner as through apertures 64 and 66 when a portion of the carpenter's level 44 is frictionally inserted into channel 72.

The length adjustment member 86 is urged by means of spring member 92, which is retained on one end by a pin 94 provided proximate the end 78 in the second frame member 70 and on its other end by a receiving screw or eye 96 (see FIG. 3) which tends to urge length adjustment member 86 to its outwardly extended position as shown in FIG. 1. A knob 98 which is inserted in a threaded aperture, not shown, in the length adjustment member 86 permits a carpenter to move the length adjustment member 86 with his hand to the length needed to hold the extension level apparatus 10 within the opening of door frame 12.

Additionally included in second frame member 70 and disposed within the channel 72 thereof is an extension block 102 which is pivoted about a pin 104 in a manner similar to that explained for block 56. A finger notch 106 is also provided at the edge 108 of solid portion 80 of the second frame member 70 to make block 102 readily moveable from one position to the other.

As is well known, the typical carpenter's level is generally four feet in length and extension blocks 56 and 102 are preferably made to be seven (7) inches in length so that when both are changed to the length extending position they will increase the length of the extension level apparatus 10 by fourteen (14) inches. Preferably, the length adjustment member 86 is permitted to extend between zero and three and three quarters (0 and 3¾) inches from end 78 of frame member 70 providing enough force by spring 92 to enable the extension level apparatus 10 to be wedged into the rough door opening 12 in order to be utilized without requiring the continuous use of a carpenter's hands when adjusting the apparatus. Preferably, the first frame member 44 and second frame member 70 are approximately four and one-half (4½) feet long and permit approximately one foot of the carpenter's level to separate the first and second frame members when the extension blocks 56 and 102 are in their extended positions.

If it should be desired to lock the first and second frame members together when either partially or fully extended and not rely on friction to hold the members together, a removable retainer plate 108 be inserted into elongated slots 110 provided in hinges 112 which are affixed over the channel 42 and 72, of the first and second frame members 44 and 70, respectively. Aperture 114 provided in retainer plate 108 permits viewing of the sight glass on the carpenter level and may be used to slide the retainer plate out through slots 110. The retainer plates may be stored beneath extension blocks 56 and 102 when not in use. It is deemed desirable to duplicate this structure on both the first and second frame members to add additional rigidity to the combined assembly. It is to be noted that a flat surface is available on the extension level apparatus on both sides which may be placed in intimate contact with the tapered shims so that the jambs, when installed in intimate contact therewith will be placed in a true vertical position.

In operation, a carpenter knowing the height of the door to be inserted in the wall opening would set the extension level apparatus 10 to its approximate proper length with the extension block 56 (block 102) in its proper position. For example, if a six (6) foot eight (8) inch opening were to be utilized, the blocks would be in their closed position or minimal extension condition as shown in FIG. 1, wherein the extension apparatus 10 preferably would be measuring approximately six (6) foot eight (8) inches and the length adjustment member 86 would be extended the additional distance to lock the apparatus between the floor and ceiling or horizontal spaced apart cross-beams. Then the carpenter shims the position of the vertically disposed member beams 20 until the extension level is in intimate contact therewith indicating the proper vertical position. The distance is marked on the ceiling or on the horizontally disposed member and the distance for the door opening is measured horizontally. The extension level apparatus is then moved to the marked off dimension A and is placed in position a second time. The beam 22, located on the other end is then shimmed for perfect squareness against the extension level apparatus. Thereafter, with the shims tacked in place, the level apparatus is removed and the door jamb installed flush with the shimmed out surfaces. As stated earlier, it may either be the pre-hung door jambs, or each individual separate door jambs. It then becomes a simple matter to install the horizontally disposed door jamb 116 between the vertically disposed members and thus, the door opening has been prepared in a manner of minutes. Once the door jambs are in place the decorative moulding 118 may be placed thereover in a conventional manner.

Hereinbefore has been disclosed a reliable extension level apparatus which is accurate and is usable for standard door heights, from anywhere between six (6) feet eight (8) inches and eight (8) feet zero (0) inches by merely selecting the proper position of the moveable elements of the extension level apparatus. It will be understood that the various changes in the details, materials, arrangement of parts and operating conditions which have been herein described and illustrated in order the explain the nature of the invention may be made by those skilled in the art within the principles and scope of the instant invention.

Having thus set forth the nature of the invention, what is claimed is:

1. An extension level apparatus suitable for use with a standard carpenter's level comprises, in combination:
    (A) first and second elongated frame members,
        (a) said first frame member having
            (i) a centrally disposed channel extending from one end and terminating at the other end in a solid portion, said channel being adapted to frictionally receive a portion of said carpenter's level therein, the distal edge of said solid portion being at right angles to the longitudinal axis of said first frame member, said one end being provided with a V-shaped notch; and
        (b) said second frame member having,
            (i) a centrally disposed channel extending from one end and terminating at the other end in a solid portion, said solid portion being provided with a centrally disposed undercut channel extending to the distal edge of said second frame member, said channel being adapted to frictionally receive the remaining portion of said carpenter's level, said one end being provided with a V-shaped notch adapted to cooperate with said V-shaped notch provided in said first frame member, and
            (ii) length adjustment means having one portion adapted to slideably engage said second frame member undercut channel and move freely therein; said one portion having a distal edge perpendicular to the longitudinal axis of said second frame member, a second portion of said length adjustment means extending towards said level when said length adjustment means is disposed within said second frame member, said length adjustment means being provided with means for locking said length adjustment means in a preselected position, and
            (iii) elongated spring means having one end affixed to said length adjustment means and the other end affixed to said second frame member for urging said length adjustment means towards a length extending position.

2. An extension level apparatus according to claim 1 wherein said first frame member is provided with an extension block means disposed in said frame channel, said extension block means being pivotable between a first and a second position, in said first position said level apparatus having a first range of length variation, in said second position said level apparatus having a second longer range of length variation.

3. An extension level apparatus according to claim 2 wherein said first frame member is provided with a finger notch means disposed in said first frame member solid portion for moving said extension block means from said first position to said second position.

4. An extension level apparatus according to claim 1 wherein said first frame member is provided with an aperture to permit viewing of the sight glass of said carpenter's level from the opposite side when said level is disposed within said first frame channel.

5. An extension level apparatus according to claim 1 wherein said second frame member is provided with an extension block means disposed in said frame channel, said extension block means being pivotable between a first and a second position, in said first position said level apparatus having a first range of length variation, in said second position said level apparatus having a second longer range of length variation.

6. An extension level apparatus according to claim 5 wherein said second frame member is provided with a finger notch means disposed in said second frame member solid portion for moving said extension block means from said first position to said second position.

7. An extension level apparatus according to claim 5 further including a removable retainer plate storable beneath said length extension block means when not in use.

8. An extension level apparatus according to claim 1 wherein said second frame member solid portion undercut channel is trapezoidally shaped when viewed on end and said length adjustment means one portion is trapezoidally shaped and adapted to slideably move in said undercut channel.

9. An extension level apparatus according to claim 1 wherein said second frame member is provided with an aperture to permit viewing of the sight glass of said carpenter's level from the opposite side when said level is disposed within said second frame channel.

* * * * *